W. W. MUIR.
CARBURETER.
APPLICATION FILED SEPT. 22, 1914.
1,147,337.  Patented July 20, 1915.
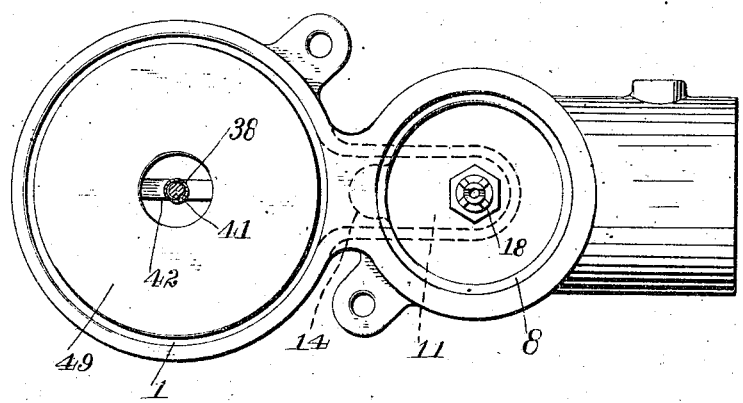
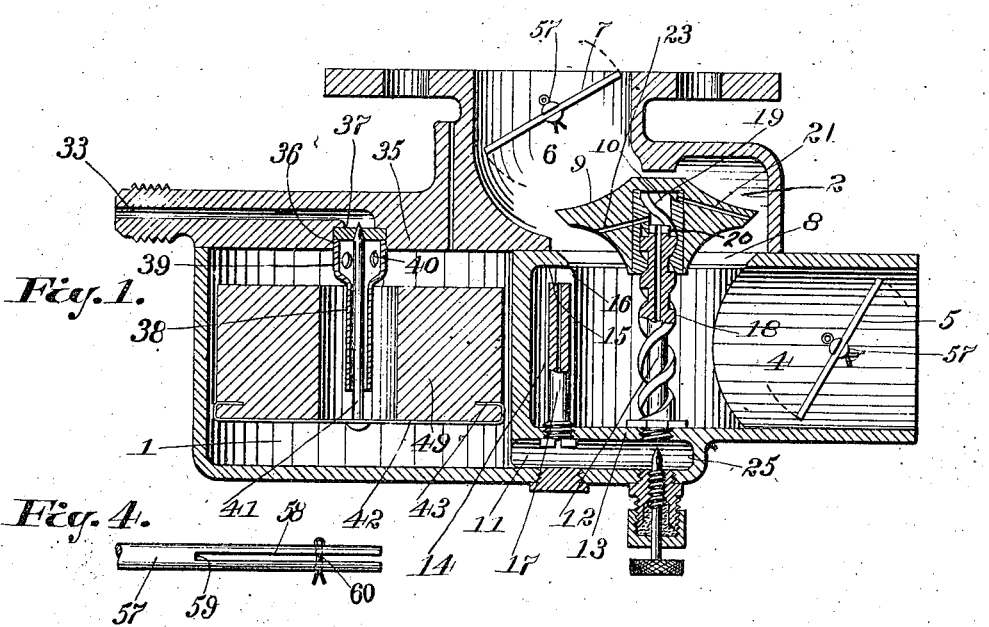
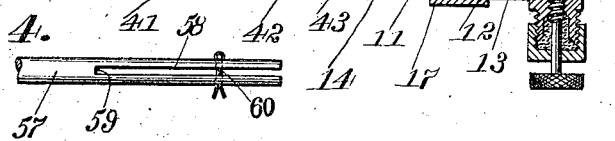
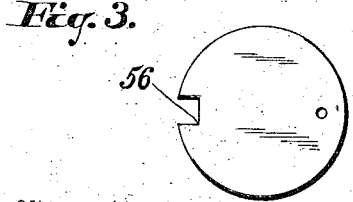
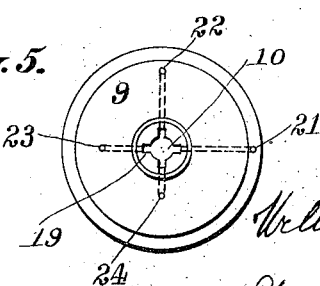

UNITED STATES PATENT OFFICE.

WELLINGTON W. MUIR, OF BALTIMORE, MARYLAND.

CARBURETER.

1,147,337.    Specification of Letters Patent.    Patented July 20, 1915.

Application filed September 22, 1914. Serial No. 862,910.

*To all whom it may concern:*

Be it known that I, WELLINGTON W. MUIR, a citizen of the United States of America, residing at city of Baltimore, State of Maryland, have invented certain new and useful Improvements in Carbureters, of which the following is a specification.

This invention relates to a carbureter of the constant level type for use with internal combustion engines.

The object of the invention is to provide in a device of this nature, simple and improved means for automatically regulating the flow of air and fuel in the proper proportions under the influence of the varying suction of the engine.

For the purpose of regulating the flow of air and fuel, a conical air float is provided. This is placed in the air passage of the carbureter and is so arranged that its vertical position is determined by the vacuum of the engine, the area of the air passage being correspondingly varied and likewise determined by the vacuum. The float is also provided with means for delivering the fuel on its conical surface, the delivery apertures being fed from a central chamber which receives the fuel nozzle, and the nozzle in turn acts as a guide for the float as well as a means for delivering the fuel in the chamber.

In the preferred form of the invention, for the purpose of steadying the movements of the air float as it rises and falls, the fuel tube is provided with a helical guide surface which coöperates with a corresponding internal helical guiding surface in the float imparting a rotary motion thereto and the fuel passages radiate from the chamber to various points on the surface of the float so that as the float rotates and rises and falls the dominating outlet is in the main air current.

In order that the supply of fuel at low throttle when the float is down and the air friction high, need not be excessive, the main nozzle and float apertures are of reduced size as compared to the area of the opening necessary to deliver fuel to the engine at full speed, and a supplementary nozzle is provided which, though suction-controlled, is located in a separate chamber communicating with the air passage, but so arranged that it only operates when an excessive volume of air is being drawn through the carbureter, thus supplying the deficiency of fuel at high speeds.

My invention in its preferred form is illustrated in the accompanying drawings in which—

Figure 1 is a vertical central section; Fig. 2 is a top plan of the bottom half of the carbureter; Fig. 3 shows the throttle valve plate. Fig. 4 shows the throttle valve shaft; and Fig. 5 shows the float in bottom plan.

The form of carbureter in connection with which my invention has been illustrated, is similar in many points to one which is the subject of my pending application, Serial No. 836,063 filed May 4th, 1914. The body portion of the carbureter consists of a bottom section and a top section, secured together by any suitable means. These two sections instead of having interengaging portions as is usually the case, have the contacting surfaces of the bottom and top respectively, finished flat and plane so that the work can be done at the minimum of cost. In the preferred form neither section projects through the plane of contact and the flat surface may be finished by grinding.

The drawing shows a float chamber 1, a carbureting chamber 2, an intake passage 4 and a delivery 6. In the intake passage 4, there is a choker valve 5, and in the delivery passage 6, a throttle valve 7. The carbureting or mixing chamber 2 and the intake passage 4 are connected by an opening 8, in which is a frusto-conical or conoidal float 9.

In the form of the invention shown, the float chamber 1 has an extension 11 beneath the carbureting chamber and there is an upright main nozzle 12 seated in the top wall 13 of this chamber. The float 9 is provided with a central aperture 10 and the nozzle extends into and well toward the top of the chamber 10 in the float 9. In fact when there is no draft or vacuum as when the engine is not running or is idling at slow speed, the float rests on the nozzle, the end of the nozzle engaging the top of the chamber in the float. At this time the float valve does not touch the periphery of the opening which, though never engaged by the float valve, might be termed a seat. This prevents sticking of the valve at starting or at other times when it should open on acceleration of engine speed after the draft has been discontinued or reduced. To provide for the feeding of gasolene when the float is resting on the nozzle, the end of the nozzle is preferably notched at 20.

At one side of the carbureting chamber 2, there is an extension or supplementary chamber 14 preferably having a top wall 15 and open at the side into the main air passage. In this chamber is a supplementary nozzle 17 also in upright position and extending downward through the top wall of the extension 11. The chamber 14 is a dead air chamber, out of the air current under normal slow running conditions.

In the preferred form of the invention as shown, the main nozzle 12 has a helical rib 18 on its surface, and the chamber 10 is provided with a corresponding helical groove 19. Radiating from the chamber 10 are fuel passages as 21, 22, 23 and 24, the first extending from the upper part of the chamber 10 to the conical surface of the float 9 near its upper edge, the second and third from points slightly lower on the chamber 10 to correspondingly lower points on the conical surface of the float, the fourth from a point well down in the chamber to a corresponding point on the surface of the float. Any preferred number of openings or passages may be used. For the purpose of regulating the flow through the nozzle 12, a needle valve 25 is provided.

In operation, at low speeds, the suction in the carbureting or mixing chamber 2 lifts the air float 9 slightly from its seat, opening a restricted air passage between the surface of the float and its seat through which the air rushes spraying the fuel from the top passage 21 into the mixing chamber 2, giving the desired and predetermined mixture at low speed. At higher speeds, the float is lifted farther from its seat increasing the area of the air passage, also lengthening the fuel passage from the nozzle 12 to the passage 21. The passage 21 is also moved to a less restricted section of the air passage so that its delivery end is subject to less air friction. In this way, the discharge from the passage 21 is decreased, but at the same time the next lower passage 22 is moved into operative position in the restricted portion of the opening 8 so that the proportion of the fuel to the flow of air is maintained. In this connection it is important to notice that if the passage 22 were made small enough to supply the exact amount of fuel to be added to the discharge of fuel from the spray passage 21 to keep the mixture constant, there would be great risk of complete stoppage of this passage by even the smallest grain of dirt so in order to avoid this risk, and make it possible to use drills of standard sizes for making these passages, advantage has been taken of the rotary motion of the float, the passages being so located at points determined experimentally that they move into or out of the full current of air flowing in an oblique direction through the carbureter, thus increasing or decreasing the spraying effect of the air at the respective passages so the predominating nozzle is always in the main air current. At the higher speeds, the passage 23 comes into operation but at the highest speeds, these three orifices 21, 22 and 23 are not of a capacity to supply sufficient fuel for the requirements of the engine, and at this point, the fuel nozzle 17, being so placed that it is not affected by the normal flow of air, comes into operation when the flow is more than sufficient to give an operative mixture with the fuel supply from the passages 21, 22 23 and 24. It is only under these conditions that the suction in the vicinity of this nozzle is sufficient to cause it to feed and the height of the nozzle may be varied to vary its scope of operation. The function of this nozzle which is about on a level with the liquid as it is placed will be easily understood from the fact that if the fuel spray passages 21, 22, 23 and 24 are made large enough to supply fuel demands of the engine at full capacity of the air passage, the flow of fuel therefrom when operating in restricted areas under the influence of a current of air flowing at a high velocity, would unduly enrich the mixture, and for this reason, it is necessary to supply additional fuel when the flexible air passage has reached its greatest capacity.

In the form of the invention shown, the bottom section includes the float chamber, the air intake, and the carbureting passages, carrying the primary or main fuel nozzle 12 and secondary or supplementary fuel nozzle 17. The top section includes the gasolene supply passage 33 and the outlet or mixture passage 6 together with the carbureting or mixing chamber 2. The passage 33 is formed on or with a disk-like portion 35, which forms the cover to the float chamber and the mouth of the passage is chambered at 36 to receive a valve seat 37, which is pressed or otherwise forced into the chamber and the float guide 38, in the form of a cupped tube, the cupped or enlarged portion 39 being formed at the top and opened upward. This cup is forced into the chamber 36, following the valve seat 37, serving to hold the latter in place. The cup 39, is perforated at 40 to form outlets for the gasolene into the float chamber and the tube proper receives and engages an upright pin valve 41 on the float 49, the latter being annular in form with the pin supported in the center of the opening. To support the pin a transverse metal plate 42 is provided. This is secured to the bottom of the float, and in the form of the invention shown, it is turned upward and inward at the ends 43, the ends being seated in slots in the float, and the plate rotated to a slight degree when it is seated, to cause its edges to cut into the cork and become securely embedded.

An important detail of the invention is found in the delivery throttle and valves 5 and 7 and the manner of mounting the same on the shaft. To this end, the valve is notched at 56, the width of the notch being the diameter of the shaft 57 and the shaft is slotted centrally at 58, in the direction of its axis, the width of the slot being the thickness of the valve. The valve is introduced into the slot from the open end and moved along the shaft until the closed end or rear wall 59, of the slot enters the notch 56. To complete the mounting of the valve, a pin 60, is passed through the shaft and through the valve or valve plate and headed over or otherwise secured. While I have described the arrangement of valve and shaft as applied to the throttle, it is clear that this may be applied to the choker or inlet valve and the other features of the device are not dependent upon this arrangement.

I claim—

1. In a carbureter a constant level fuel supply chamber, a carbureting chamber or passage with a valve opening and seat therein, a float valve coöperating with the opening and seat, a main fuel supply nozzle delivering fuel in the immediate vicinity of the opening and subject to the air current at highest velocity, and a supplementary fuel nozzle set back from the float valve opening, on the air inlet side so that it is operative only under full throttle conditions.

2. In a carbureter a constant level fuel supply chamber, a carbureting chamber or passage with a valve opening and seat therein, a float valve coöperating with the opening and seat, a main fuel supply nozzle delivering fuel in the immediate vicinity of the opening and subject to the air current at highest velocity, and a dead air chamber containing a supplementary nozzle, the chamber being closed at the top and bottom and open at the side into the main air passage.

3. In a carbureter, a constant level fuel supply chamber, a carbureting chamber or passage with a valve opening and seat therein, an air float valve coöperating with the opening and seat and having a central chamber, fuel passages radiating from the chamber to the surface of the float, a main fuel nozzle on which the float reciprocates, the nozzle delivering fuel in the chamber, the inlet ends of the passages being arranged in different horizontal planes so that they are covered and uncovered in turn as the float moves up and down.

4. In a carbureter, a constant level fuel supply chamber; a carbureting passage with a valve opening and seat therein, the delivery end of the passage being offset to one side of the valve opening, an air float valve coöperating with the opening and seat and having a central chamber, fuel passages radiating from the chamber to the surface of the float, a main fuel nozzle delivering fuel in the chamber, the nozzle and chamber being threaded to rotate the float as it moves up and down, the inlet ends of the passages being arranged in different horizontal planes so they are covered and uncovered in turn as the float reciprocates and having their delivery ends so arranged in radiating vertical planes that the passages open as to their delivery ends in the most intense portion of the air current.

5. In a carbureter a liquid fuel supply an air float having a chamber with a helical groove therein, an upright guide therefor with a helical surface whereby a rotary motion is imparted to said air float, a mixing chamber with an air passage controlled by the float, and the upright guide having a passage therein leading to the liquid fuel supply for admitting fuel to the air passage and a series of passages leading from the chamber in the float to the surface of the float, the passages being spaced in a vertical direction.

6. In a carbureter an air passage, an air float controlling said air passage, fuel supplying passages in the air float, the outlet ends of the passages being placed in different horizontal planes means for supplying fuel thereto, means for rotating said air float as it rises and falls whereby the fuel supply passages are moved into and out of the air current increasing and decreasing the spraying effect at the respective passages.

7. In a carbureter a constant level fuel supply chamber, a constant air opening, an air chamber having a valve opening and a valve seat, a conical air float valve controlling said passage and having fuel spraying passages at different levels and a guide chamber therein, means for rotating said air float as it rises and falls, said means consisting of a stationary guide having a helical surface, a corresponding helix in the chamber in the float the guide having a central passage for supplying fuel to the passages in the float.

8. In a carbureter a constant level fuel supply chamber, a constant air opening, an air passage, an air float controlling said passage and having fuel spraying passages and a guide chamber therein, means for supplying fuel to the passages, means for rotating said air float as it rises and falls, said means consisting of a guide having a helical surface and a corresponding helix in the chamber of the float, a dead air chamber communicating with the air passage, and a suction-controlled fuel nozzle in the chamber.

9. In a carbureter a constant level fuel supply chamber, an air opening, an air float controlling said passage and having a guide chamber therein, a fuel nozzle extending into the chamber, means on the nozzle and coöperating means on the walls of the guide chamber for giving the float a rotary movement as it rises and falls and fuel outlet openings in the float the openings being spaced vertically so that each passage becomes available in turn to deliver its maximum discharge as the float moves up and down.

10. In a carbureter a constant level fuel supply chamber, an air opening, an air float controlling said passage and having a guide chamber therein, the fuel nozzle extending into the chamber, means on the nozzle and coöperating means on the walls of the guide chamber for giving the float a rotary movement as it rises and falls, a dead air chamber communicating with the air passage and a suction-controlled fuel nozzle in the chamber the second main fuel nozzle being on the intake side of the float and outside the constricted area around the float so that the nozzle is operative only under full throttle conditions.

11. In a carbureter, a constant level supply chamber, an air opening, a conical air float controlling said opening and having a vertically extending chamber therein, a fuel nozzle extending into the chamber, means on the nozzle and coöperating means on the walls of the guide chamber for giving the float a rotary movement as it rises and falls, fuel outlet passages radiating from the chamber in the air float and a supplementary fuel nozzle on the intake side of the float and outside the constricted portion around the float so that it is operative only under full throttle conditions.

12. In a carbureter, a constant level supply chamber, an air opening, a conical air float controlling said opening and having a vertically extending chamber therein, a fuel nozzle extending into the chamber, means on the nozzle and coöperating means on the walls of the guide chamber for giving the float a rotary movement as it rises and falls and fuel outlet passages radiating from the chamber in the air float, the outlet passages being spaced from top to bottom of the float and in radiating planes separated by substantially equal arcs.

13. In a carbureter, a constant level supply chamber, an air opening, a conical air float controlling said opening and having a vertically extending chamber therein, a fuel nozzle extending into the chamber, means on the nozzle and coöperating means on the walls of the guide chamber for giving the float a rotary movement as it rises and falls and fuel outlet passages radiating from the chamber in the air float, the outlet passages being spaced from top to bottom of the float in radiating planes and substantially horizontal.

14. In a carbureter, a constant level supply chamber, an air opening, a conical air float controlling said opening and having a vertically extending chamber therein, a fuel nozzle extending into the chamber, means on the nozzle and coöperating means on the walls of the guide chamber for giving the float a rotary movement as it rises and falls and fuel outlet passages radiating from the chamber in the air float, the outlet passages being spaced from top to bottom of the float.

Signed at Baltimore, Maryland this 22nd day of September 1914.

WELLINGTON W. MUIR.

Witnesses:
EDWARD L. BASH,
EDWIN F. SAMUELS.